UNITED STATES PATENT OFFICE.

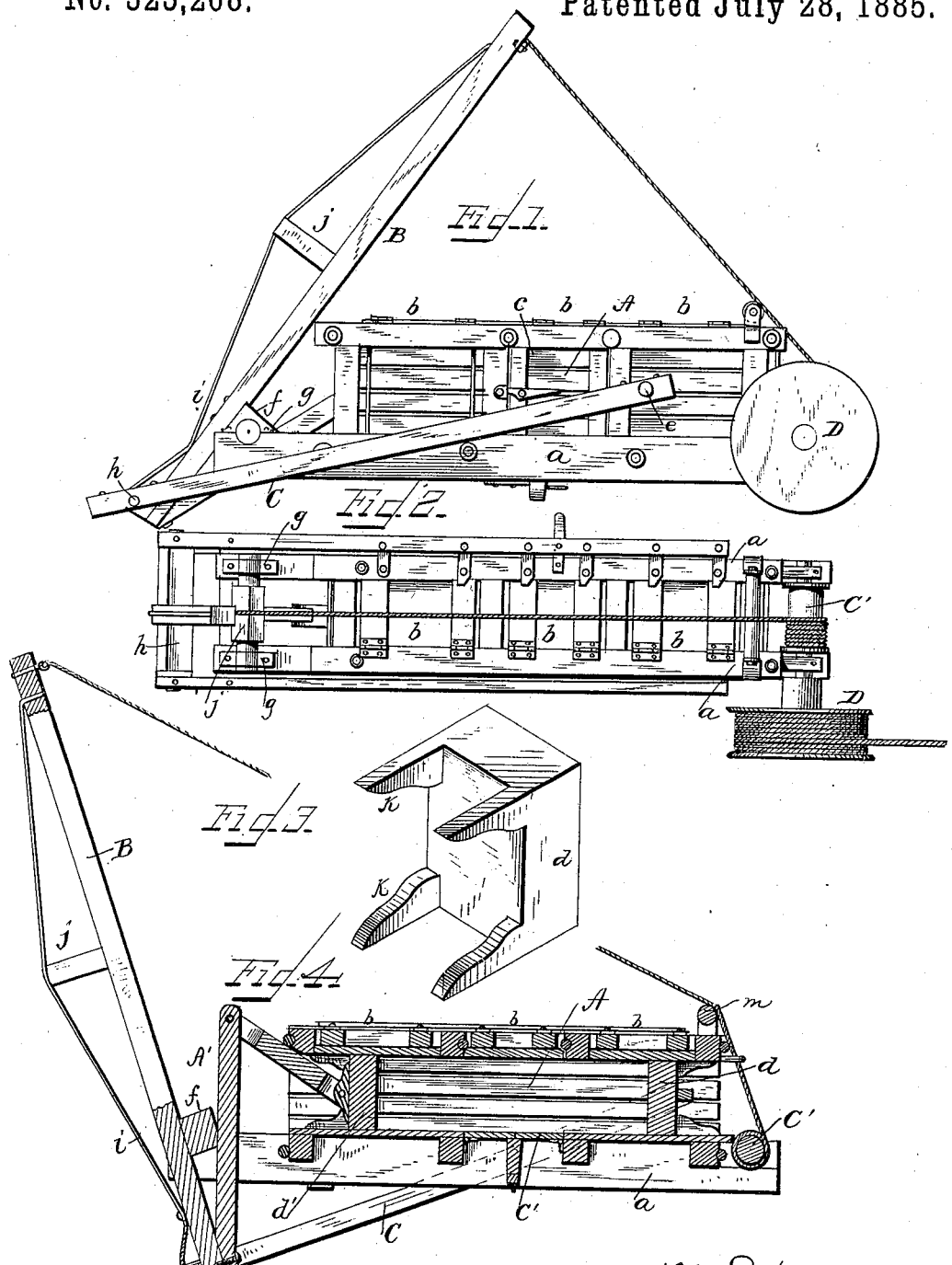

THOMAS P. BRAGG, OF ENNIS, ASSIGNOR OF ONE-HALF TO GEORGE G. HIGGINBOTHAM, OF ELLIS COUNTY, TEXAS.

HAY OR COTTON PRESS.

SPECIFICATION forming part of Letters Patent No. 323,268, dated July 28, 1885.

Application filed June 11, 1885. (No model.)

*To all whom it may concern:*

Be it known that I, THOMAS P. BRAGG, a citizen of the United States, residing at Ennis, in the county of Ellis and State of Texas, have invented certain new and useful Improvements in Hay or Cotton Presses; and I do hereby declare the following to be a full, clear, and exact description of the invention, such as will enable others skilled in the art to which it appertains to make and use the same.

This invention relates to an apparatus for baling cotton, hay, and like material; and it consists, substantially, in the apparatus as constructed, and in such other details as will hereinafter be distinctly described, and pointed out in the claims.

The class of apparatus to which my invention is most nearly allied is that in which the plungers or followers for compressing the hay are caused to move in a horizontal line or direction; and the mechanism for carrying the same into effect comprises a main operating-lever and an arrangement of double or compound toggle-levers so connected together and to the followers that upon application of the requisite power the latter are caused to move toward each other simultaneously, and thus act to compress or bale the hay between them.

Referring to the accompanying sheet of drawings, Figure 1 represents a longitudinal side elevation of press or apparatus embodying my invention; Fig. 2, a top or plan view thereof; Fig. 3, a detail perspective of the follower or plunger; and Fig. 4 represents a longitudinal sectional view to more clearly indicate the construction, operation, and connection of parts.

Reference being had to the several parts by the letters marked thereon, A represents an oblong boxing or casing constructed of suitable frame-work, mortised and united by rods and bolts, as shown, or in any suitable manner. This casing is mounted upon two longitudinal base-pieces, $a$, and provided in its top with outwardly-opening doors $b\ b\ b$, and in its side and bottom with similar doors, $c\ c'$, fastened by a suitable latch, as shown.

The baling or compressing mechanism is constituted of a main operating-lever, B, by which the power is received and communicated to auxiliary levers C C, extending lengthwise each side of the casing, and connected by a cross-rod, $e$, to the forward plunger or follower, $d$, as shown, said main lever B having a shorter arm or toggle-lever, A', which is pivotally connected to the plunger $d'$, as are the auxiliary levers to the plunger $d$. The main lever and its toggle-arm bear between them a semi-rotating fulcrum-block, $f$, having its bearings in the boxes $g\ g$, at one end of the base-strips $a$, as shown, and the said main lever and arm A' are connected centrally to a cross-piece, $h$, which is revoluble in and extends between the free ends of the auxiliary levers C C. Secured to the cross-piece $h$ is a rod, $i$, which curves inwardly at the bottom, and is secured also to the lower end of the main lever by a screw, as shown, thence extending slightly outward and resting upon or against a block, $j$, and finally secured to the lever at or near its outer end. The fulcrum-block $f$ supplies a leverage between the main lever and its arm. The followers or plungers each are formed with extensions K, which tend to prevent them from becoming overturned upon their pivots in that during the reciprocating movement of said plungers these legs, by coming in contact with either the bottom or top of the casing, will always maintain the same in their proper relative positions. C' represents a revolving drum on which is wound a cord or rope having its end secured to the end of the main lever, as shown. On the end of this drum is a pulley, D, around which a rope is wound oppositely to that on the drum, this pulley being employed when hand or horse power is resorted to for operating the press. Preferably, however, I intend using a large driving-wheel on the end of the drum. (Not shown.) $m$ represents a friction-roll, against which the cord on the drum moves.

Operation: The hay or other material is packed in the case or boxing through the doors at the top, the main lever having previously been brought backward to its fullest extent, as shown in Fig. 4, whereupon power is applied at D, revolving the drum C' until its cord becomes taut, thus exerting the effect of drawing the lever B forward to the position shown in Fig. 1, and consequently causing the followers or plungers to be moved toward each other simultaneously, and thereby compress or bale the hay or cotton between them. The plungers may be held to their positions against the bale until the latter is properly tied, which is usually effected through the side door, c, and when this latter has been done the bale is ejected from the door c' in the bottom.

In the employment of a power-wheel on the drum the operation is performed by simply giving to such wheel a sufficient impetus, whereupon the plungers are caused to compress the hay between them, and when the extent of their movement has been reached a sudden retrograde of the wheel takes place and the lever B is forced backward to its primitive position.

Having thus described my invention, what I claim, and desire to secure by Letters Patent, is—

1. In a hay-press, the combination of a box or casing, a main operating-lever having a semi-rotating fulcrum, auxiliary levers, and followers, and intermediate connections, and a drum and cord whereby the parts are operated, substantially as specified.

2. In a hay-press, the combination of the box or casing having suitable doors in its top, bottom, and side, and supported on longitudinal base-strips, a main lever having a short toggle-arm, a semi-rotating fulcrum therefor, auxiliary levers pivotally connected with the main lever, reciprocating followers, and a drum and cord, substantially as described.

3. In a hay-press, the combination of the box or casing having friction-roll m, the levers B and A', and semi-rotating fulcrum-block f, the auxiliary lever C, followers d d', rod i, and the drum C', having thereon a cord attached to the main lever, all substantially as described.

In testimony whereof I affix my signature in presence of two witnesses.

THOS. P. BRAGG.

Witnesses:
M. B. TEMPLETON,
W. J. EDMUNDSON.